Nov. 10, 1959 R. W. HUGHES 2,912,508

REPEATER STATION FOR A PULSE MULTIPLEX SYSTEM

Filed Sept. 8, 1955 3 Sheets-Sheet 1

INVENTOR
ROBERT W. HUGHES
BY Alfred C. Hill
AGENT

Nov. 10, 1959 R. W. HUGHES 2,912,508

REPEATER STATION FOR A PULSE MULTIPLEX SYSTEM

Filed Sept. 8, 1955 3 Sheets-Sheet 2

INVENTOR
ROBERT W. HUGHES
BY Alfred C. Hill
AGENT

REPEATER STATION FOR A PULSE MULTIPLEX SYSTEM

Filed Sept. 8, 1955 3 Sheets-Sheet 3

INVENTOR
ROBERT W. HUGHES
BY Alfred C. Hill
AGENT

United States Patent Office 2,912,508
Patented Nov. 10, 1959

2,912,508

REPEATER STATION FOR A PULSE MULTIPLEX SYSTEM

Robert W. Hughes, Mountain Lakes, N.J., assignor to International Telephone and Telegraph Corporation, Nutley, N.J., a corporation of Maryland Application September 8, 1955, Serial No. 533,077

13 Claims. (Cl. 179—15)

This invention relates to communication systems and, more particularly, to pulse communication systems provided with means for demodulating a channel pulse or pulses and/or for directly modulating a channel pulse or pulses passing through a repeater station intermediate the principal terminals of the system.

Systems for multiplex communication by means of interleaved, timed, pulses have heretofore been proposed. In these systems, generally, the segregation of the channels is accomplished by timing selector means with the individual channel signals being timed with respect to a synchronizing signal. In such pulse multiplex systems, it has been proposed to provide repeater stations for selecting one or more of the channels at different repeater points. In these proposed systems, the pulses defining channel signals selected at an intermediate or repeater station have been suppressed in the common transmission medium so that the pulses do not continue to the end or ultimate terminal. Where desired the suppressed channel signals are replaced with other apropriately timed pulses generated at the repeater station and signal modulated by a source in communication with the repeater station. The equipment necessary for the channel pulse suppression and regeneration is complex. The complexity of such equipment is unnecessary and unwarranted where simple supervisory instructions and signaling information are desired to be communicated between repeater stations and one or the other of the principal terminals.

It is an object of the present invention to provide an improved repeater station for accomplishing communication between a repeater station and one or both of the principal terminals and other repeater stations without necessitating the complex drop and insert equipment of the prior art.

Another object of the present invention is to provide at an intermediate or repeater station in a multiplex pulse transmission system a pair of parallel paths, the equipment of one of said paths passing all the pulses with the exception of a selected channel pulse and the other of said paths passing only the selected channel pulse with means included in the last-mentioned path to modulate the selected channel pulse with modulating signals in communication with the repeater station.

A feature of this invention is the provision of an intermediate station coupled to a transmission medium carrying thereon a series of pulse trains, each of said pulse trains including a synchronizing signal and a plurality of time interleaved channel signals displaced in time from said synchronizing signal, said intermediate station comprising a normally conductive path and a normally non-conductive path for transmission of the pulse trains therethrough. There is further provided means responsive to said synchronizing signal to produce an "on" gate pulse and an "off" gate pulse corresponding in time to a selected one of said channel signals, means in the non-conductive path to modulate said pulse trains in accordance with the signals of a signal source, means responsive to said "off" gate pulse to render said conductive path non-conductive during the occurrence of said selected channel signal and means responsive to said "on" gate pulse to render said non-conductive path conductive during the occurrence of said selected channel pulse for passage of said selected channel signal.

Another feature of this invention includes a means responsive to the means for producing a gate pulse and in communication with the normally conductive path to demodulate selected ones of channel pulses carried on the pulse trains traveling through the common medium.

Further features of this invention include a variable delay modulator in the non-conductive path to modulate the pulse trains applied thereto which may take the form of a delay multivibrator or a low-pass filter-type delay line wherein the modulating signal may vary the capacitance or inductance or both components simultaneously to achieve the desired modulation.

The above-mentioned and other features and objects of this invention will become more apparent by reference to the following description taken in conjunction with the accompanying drawings, in which.

Figure 1:
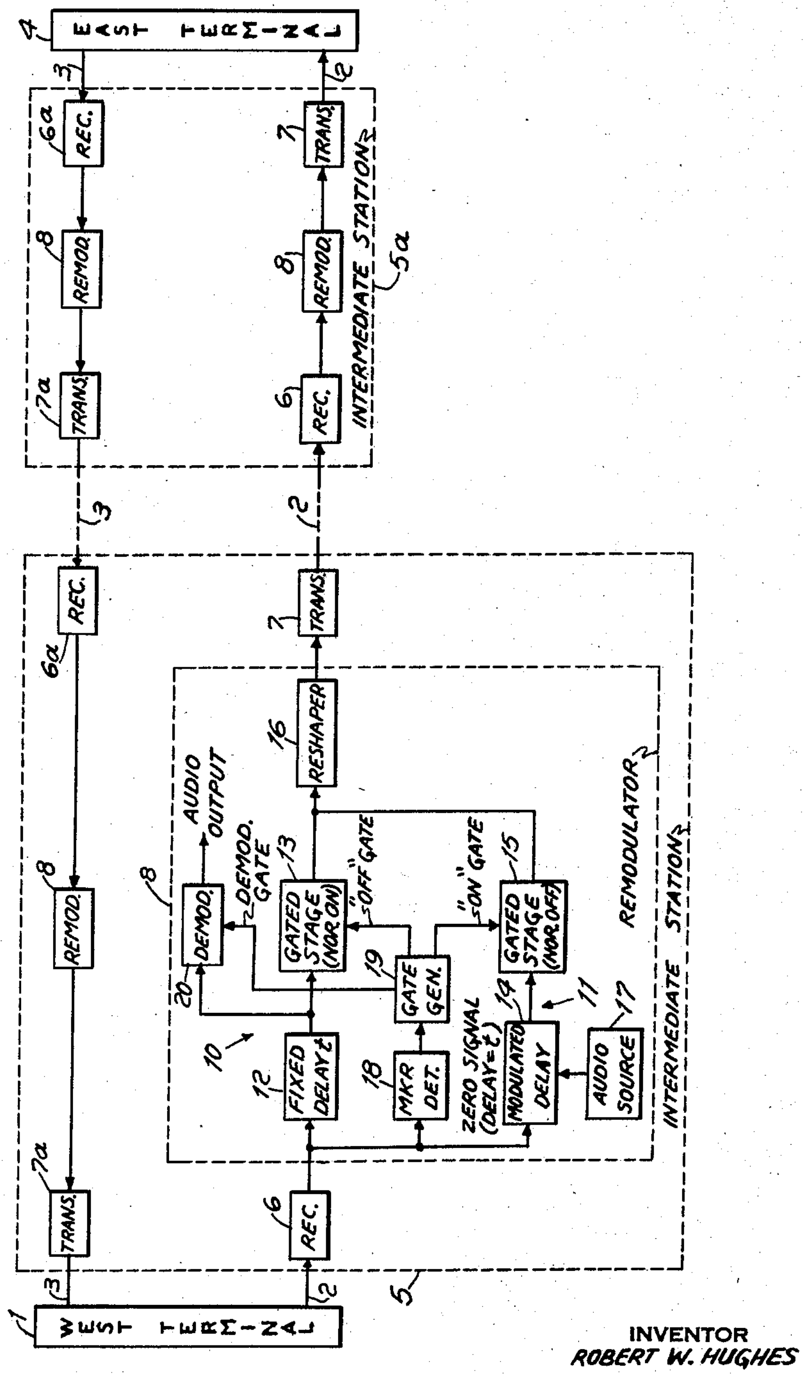
Fig. 1 is a schematic diagram in block form of a communication system incorporating the features of this invention.

Referring to Fig. 1, there is illustrated a pulse communication system comprising west terminal 1 coupled over transmission medium 2 and 3 to an east terminal 4. Intermediate terminals 1 and 4 are provided repeater stations 5 and **5*a*. Each of the intermediate or repeater stations is provided with a receiver 6 and transmitter 7 to couple the stations to the transmission medium 2 for communication in the west-east direction and a receiver 6*a* and transmitter 7*a* to couple the stations to medium 3 for communication in the east-west direction. The stations further include a remodulator 8** which functions to enable supervisory communication between the principal terminals and other intermediate stations without channel signal suppression and regeneration means. The term "remodulator" employed herein refers to that equipment which enables the direct modulation of a selected channel pulse at an intermediate or repeater station without suppressing a received channel pulse and reinserting a locally generated channel pulse. The equipment may include demodulator circuitry enabling the demodulation of a selected channel pulse.

Figure 2:
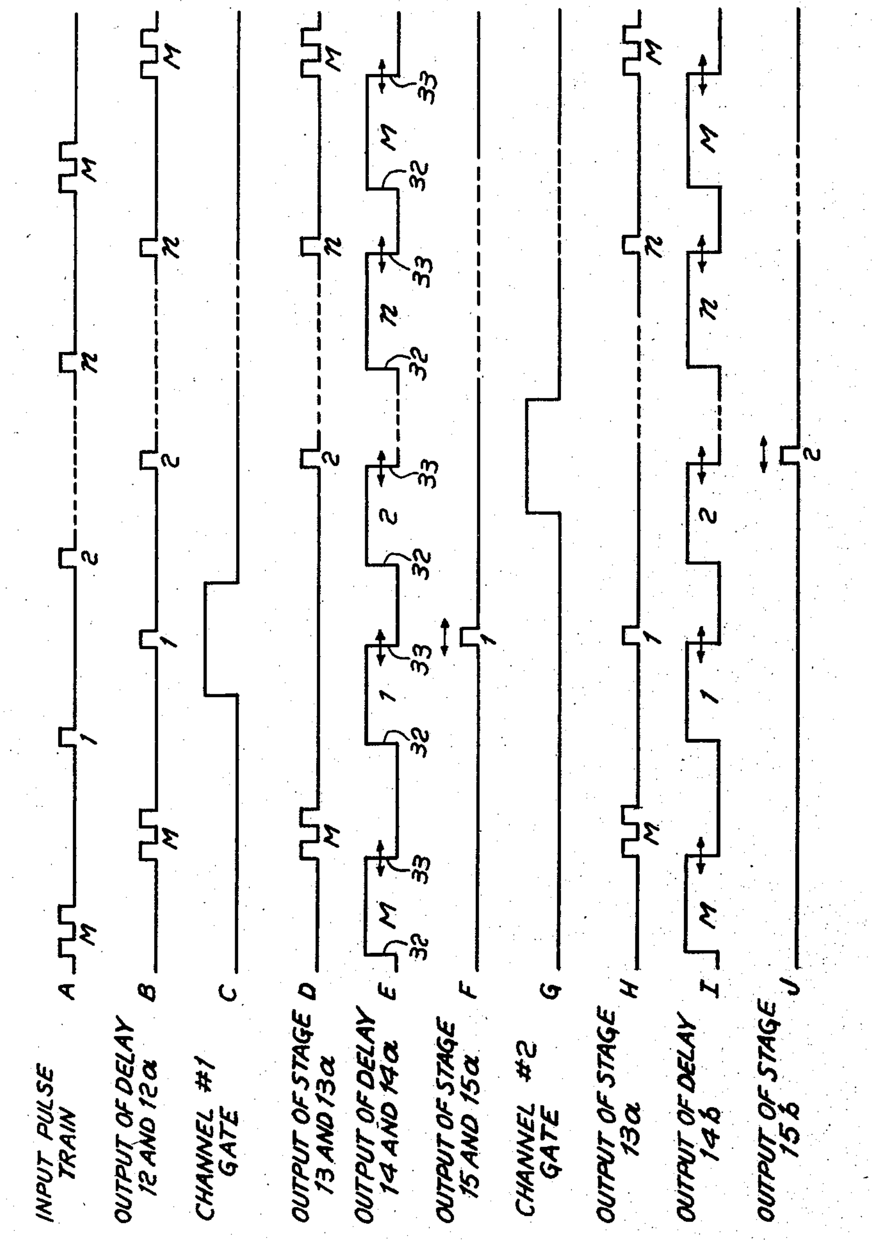
Fig. 2 is a set of curves illustrating the operation at various repeater stations in accordance with this invention.

It is understood that terminals 1 and 4 are multiplex transmitter-receiver arrangements with the transmitting portion thereof supplying a large number of channels for multichannel communication. Referring to Fig. 2, curve A, there is illustrated a train of pulses which may be transmitted from terminal 1 and includes therein a synchronizing signal and a plurality of channel signals numbered 1 through *n*.

By utilizing a selected channel of a pulse train transmitted in the west-east direction. the west terminal may forward instructions to intermediate station 5 which includes equipment in remodulator 8 to demodulate the selected channel. For communication between intermediate station 5 and the west terminal, the remodulator 8 of the east-west communication path will function to transmit signals at station 5 to the west terminal, thereby providing two-way communication between the principal terminal and one of the intermediate stations. By appropriately selecting channel signals on the pulse train transmitted from either of the terminals 1 and 4, communication may be had between intermediate stations 5 and 5a or between any one of the intermediate stations and either one of the principal terminals.

Referring to Fig. 1, the detailed circuitry of remodulator 8 will be discussed in detail. Remodulator 8 receives a pulse train from terminal 1 having the characteristics illustrated in curve A of Fig. 2. This input pulse train is applied to a normally conductive path 10 and a normally non-conductive path 11 in parallel. Path 10 includes therein a fixed delay 12 and a normally "on" gating stage 13. The path 11 includes a modulator 14 and a normally "off" gating stage 15. The output from each of these conductive paths is coupled to a common output stage or reshaper 16 wherein the outputs of the paths are combined on a timed basis to rebuild the pulse train for transmission along the common medium 2. The fixed delay of path 10 is required when the modulation of the channel signals is a time modulation but may be omitted if the modulation is a pulse amplitude type modulation. The discussion hereinbelow will consider the modulation carried by the channel signals as being a time modulation.

The input pulse train, curve A, Fig. 2, experiences a delay in delay 12, as illustrated in curve B of Fig. 2, while the curve A of Fig. 2 is modulated by a delay modulator 14, as illustrated in curve E of Fig. 2, in accordance with the signals of the audio source 17, thereby making the pulse train delay in path 11 a function of the local audio signal. The zero signal delay of delay modulator 14 is equal to the time delay of the fixed delay 12. The waveform of curve E of Fig. 2 is representative of the output of a delay multivibrator type delay modulator discussed hereinbelow with respect to Fig. 5.

The input pulse train is likewise coupled to a marker detector 18 which detects the synchronizing signal and in conjunction with a gate generator 19 provides three different gate signals appropriately timed for operation on a selected channel signal. In the instance illustrated in Fig. 2, the selected channel signal is that of channel #1. The gate generator 19 couples an "off" gate to stage 13 and blocks the passage of channel #1 along path 10, as illustrated in curve D, Fig. 2, and at the same instance an "on" gate pulse is applied to stage 15 to permit the passage of the modulated channel #1 through path 11, as illustrated in curve F of Fig. 2. Curve C, Fig. 2, is representative of a possible gate pulse from generator 19. The polarity thereof is dictated by the point of application to the stages 13 and 15. With the polarity shown, the gate pulse would be applied to the cathode of stage 13 to constitute the "off" gate pulse and would be applied to the control grid of stage 15 to constitute the "on" gate pulse. Other combinations of gate polarity and electrode acted upon in stages 13 and 15 will be obvious to one skilled in the art.

As a result of the operation of the "on" and "off" gate pulses, there appears at the input of reshaper 16 the selected channel pulse modulated in path 11 in accordance with audio source 17 by variable delay line or modulator 14 while all the other remaining pulses come through the normally conductive path 10. The signal applied to the selected channel signal at a station 5 may be utilized for communication with station 5a or the east terminal 4. The answer to the above communication would be sent from terminal 4 or station 5a along medium 3. This answer would be detected in the remodulator 8 coupled to the medium 3 by employing a gate generator 19 which is responsive to the synchronizing signal of the transmitted pulse train to produce a demodulating gate pulse of proper timing for activation of demodulator 20. Demodulator 20 operates on the output pulse train of fixed delay 12 at the proper instant as dictated by the demodulator gate to extract the audio signal from the selected channel pulse.

Figure 3:
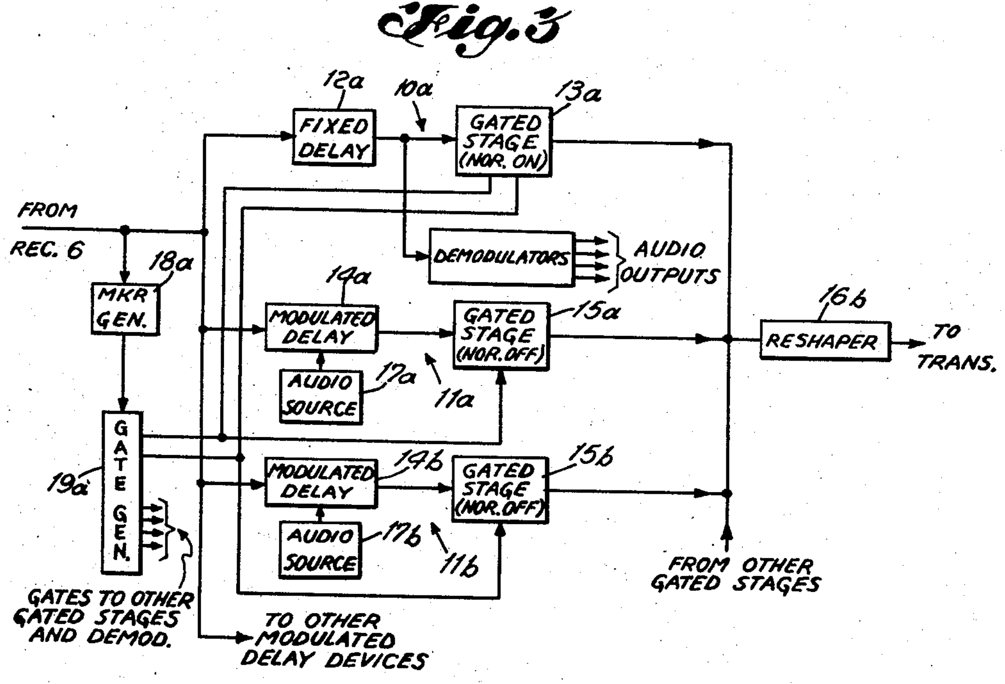
Fig. 3 is a schematic diagram in block form of another embodiment of this invention.

The description with reference to Fig. 1 has been concerned with the modulation of a single channel signal. Referring now to Fig. 3, an arrangement is illustrated which enables the modulation of two or more selected channels signals by utilizing a single conductive path 10a and a plurality of normally non-conductive paths 11a and 11b. Likewise, there is coupled to path 10a a means to demodulate the intelligence of a plurality of selected channel signals under the control of properly timed gating pulses produced in generator 19a. As in Fig. 1, the input pulse train, curve A, Fig. 2, is coupled to the conductive path 10a and the non-conductive paths 11a and 11b, and likewise, to the marker detector 18a and the gate generator 19a. The output pulse train of fixed delay 12a is delayed with respect to the input train, as illustrated in curve B, Fig. 2, by an amount sufficient to enable the operation of the modulated delay lines 14a and 14b when excited by the input pulse train. In response to gate generator 19a, a gate pulse is produced in proper time relationship with respect to channel #1 of curve B, as illustrated in curve C, Fig. 2, and at the same time produces a channel #2 gate pulse in proper time relationship with channel #2 of the pulse train of curve B, Fig. 2. An "off" gate pulse is coupled to gated stage 13a of path 10a to block the passage of the channel #1 signal, as illustrated in curve D, Fig. 2, and a given time later an "off" gate pulse is coupled to gated stage 13a to block the passage of the channel #2 signal, as illustrated in curve H of Fig. 2. While the "off" gate pulse is blocking the passage of channel #1 signal in path 10a, an "on" gate pulse is supplied to gated stage 15a for passage of the channel #1 pulse, modulated in accordance with the signal of source 17a which varies the time delay of variable delay means 14a, as illustrated in curve F, Fig. 2. A time coincident with the blocking of the channel #2 pulse in path 10a, an "on" gate pulse is supplied to gated stage 15b for passage of the channel #2 pulse through path 11b, modulated in accordance with source 17b, as illustrated in curve J, Fig. 2. The outputs of these paths are combined in the reshaper 16b to rebuild the pulse train for communication along the common transmission medium, said pulse train including the two channels modulated directly at any intermediate station.

Figure 4:
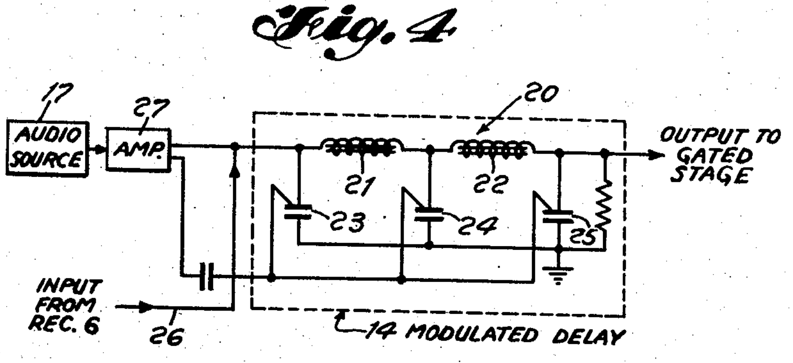
Fig. 4 is a schematic diagram, partially in block form, of a time modulator which may be used as a portion of the circuit in accordance with this invention.

Referring now to Fig. 4, there is illustrated one form of modulated delay or variable delay means which may be utilized in the remodulators of the intermediate stations. The modulated delay includes a low-pass filter-type of delay line 20 including inductors 21 and 22 whose value of inductance may be varied by an audio signal and condensers 23, 24 and 25 whose value of capacitance may be varied by an audio signal. The pulse train from receiver 6 is coupled along conductor 26 to the delay line 20. The time delay of delay line 20 is varied by the audio signal of source 17 and amplifier 27 acting on the inductors and capacitors separately or by simultaneously modulating in a linear fashion both the inductors 21 and 22 and the condensers 23, 24 and 25, as illustrated. Since the delay line impedance is characterized by the expression $$Z=\sqrt{\frac{L}{C}}$$

then this impedance would remain constant with modulation, thereby eliminating reflection problems when the inductors and condensers are simultaneously modulated. Also, the time delay is given by $$T=\sqrt{LC}$$

and since $$L=K_1 \cos w_a t$$

and $$C=K_2 \cos w_a t$$

then $$T=\sqrt{K_1 K_2 \cos w_a t}$$

thereby giving linear pulse time modulation as desired.

Figure 5:
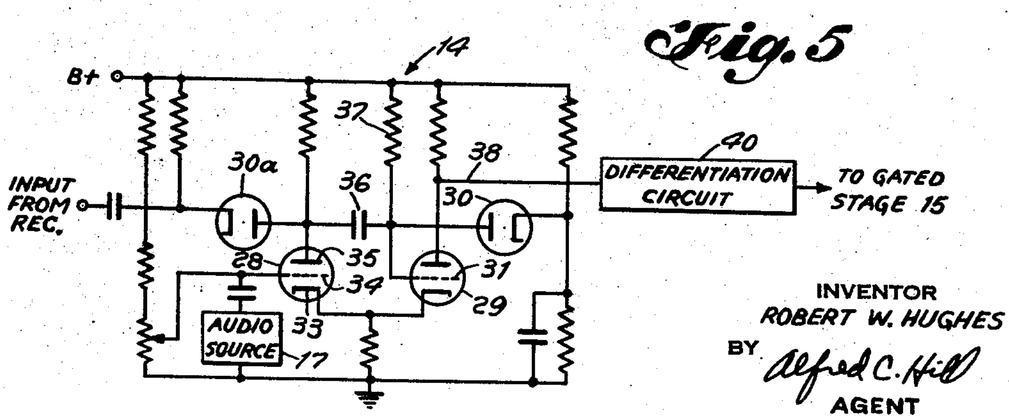
Fig. 5 is a schematic diagram of still another time modulator which may be used as a portion of the circuit in accordance with this invention.

Referring now to Fig. 5, there is illustrated still another form of modulated delay or variable delay means 14 to provide a variable delay for the passage of the input pulse train through path 11, said variable delay being controlled by an audio signal with which a selected channel pulse of the pulse train is to be modulated. The circuit of Fig. 5 is a typical delay multivibrator and includes triode type electron discharge devices 28 and 29 interconnected as a cathode coupled monostable multivibrator. The initial and stable state of the modulated delay or delay multivibrator 14 is with device 29 in the "on" condition and device 28 in the "off" condition. The diode 30 is used to define the initial level of the control grid 31 of device 29. When a nevative pulse, corresponding to the pulses of a pulse train, is injected through diode 30*a*, device 29 is turned "off" establishing the leading edge 32 of the pulse of curve E, Fig. 2. Cathode 33 is thereby dropped to within a few volts of the grid 34 of device 28, turning device 28 "on." A negative rectangle is thus generated at the anode 35 of device 28 and, after differentiation in the timing network including condenser 36 and resistor 37, becomes the exponential timing waveform on grid 31 of device 29. After a definite time interval, the grid of device 29 crosses the grid base of the device 29 and the circuit reverts quickly to its original state. It is well known that over nearly the entire operating range the duration of the rectangle generated is a linear function of the voltage impressed on the grid of device 28. Thus, by impressing the output of audio source 17 upon grid 34 of device 28, the duration or delay of the rectangle at the output 38 of the delay multivibrator can be varied in accordance with the signal of source 17, as illustrated by the trailing edge 39 of curve E, Fig. 2, and thereby provide the desired modulated delay required in the remodulator of this invention. The rectangle at output 38 is passed through a differentiation circuit 40 prior to being applied to stage 15 to produce a pulse corresponding to the varying trailing edge of the output pulses of modulator 14. This is illustrated in curve F, Fig. 2.

The modulator system hereinabove described permits the use of phase shift signaling since signaling information may pass through the repeater point without loss of information. It is possible to superimpose audio modulation upon the signaling information to the same extent permitted at terminals. Since the delay lines utilized in the remodulator are inherently stable components and since the delay modulator would be referred to ground, the stability of this method for phase shift signaling is inherently high.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a pulse communication system comprising first terminal means for transmitting a series of pulse trains, each of said pulse trains including a synchronizing signal and a plurality of time interleaved channel signals displaced in time from said synchronizing signal, a second terminal means for receiving said pulse trains through a common medium interconnecting said terminals, an intermediate station coupled to said medium and comprising a normally conductive path and a normally nonconductive path for said pulse trains through said intermediate station, a signal source, means included in said non-conductive path to modulate all of the signals of said pulse trains in accordance with the signals of said signal source, means responsive to said synchronizing signal to produce an "on" gate pulse and an "off" gate pulse corresponding in time to a selected one of said channel signals, means responsive to said "off" gate pulse to render said conductive path non-conductive during the occurrence of said selected channel signal, and means responsive to said "on" gate pulse to render said non-conductive path conductive during the occurrence of said selected channel signal for passage of said selected channel signal, said selected channel signal carrying the modulation of said signal source.

2. A system according to claim 1, wherein said non-conductive path includes a variable delay means the time delay of which is varied in accordance with the signal of said signal source to time modulate said pulse trains.

3. A system according to claim 2, wherein said conductive path includes a fixed delay having a time delay equal to the nominal time delay of said variable delay means.

4. A system according to claim 2, wherein said variable delay includes a delay multivibrator.

5. In a pulse communication system comprising first terminal means for transmitting a series of pulse trains, each of said pulse trains including a synchronizing signal and a plurality of time interleaved channel signals displaced in time from said synchronizing signal, a second terminal means for receiving said pulse trains through a common medium interconnecting said terminals, an intermediate station coupled to said medium and comprising a normally conductive path and a normally non-conductive path for said pulse trains through said intermediate station, a signal source, means included in said non-conductive path to modulate said pulse trains in accordance with the signals of said signal source, means responsive to said synchronizing signal to produce an "on" gate pulse and an "off" gate pulse corresponding in time to a selected one of said channel signals, means responsive to said "off" gate pulse to render said conductive path non-conductive during the occurrence of said selected channel signal, and means responsive to said "on" gate pulse to render said non-conductive path conductive during the occurrence of said selected channel signal for passage of said selected channel signal, said selected channel signal carrying the modulation of said signal source, said non-conductive path including a variable delay means the time delay of which is varied in accordance with the signal of said signal source to time modulate said pulse trains, said variable delay including a low-pass filter-type delay line and a signal of said signal source modulates the inductance of said delay line.

6. In a pulse communication system comprising first terminal means for transmitting a series of pulse trains, each of said pulse trains including a synchronizing signal and a plurality of time interleaved channel signals displaced in time from said synchronizing signal, a second terminal means for receiving said pulse trains through a common medium interconnecting said terminals, an intermediate station coupled to said medium and comprising a normally conductive path and a normally non-conductive path for said pulse trains through said intermediate station, a signal source, means included in said non-conductive path to modulate said pulse trains in accordance with the signals of said signal source, means responsive to said synchronizing signal to produce an "on" gate pulse and an "off gate pulse corresponding in time to a selected one of said channel signals, means responsive to said "off gate pulse to render said conductive path non-conductive during the occurrence of said selected channel signal, and means responsive to said "on" gate pulse to render said non-conductive path conductive during the occurrence of said selected channel signal for passage of said selected channel signal, said selected channel signal carrying the modulation of said signal source, said non-conductive path including a variable delay means the time delay of which is varied in accordance with the signal of said signal source to time modulate said pulse trains, said variable delay including a low-pass filter-type delay line and the signal of said signal source modulates the capacitance of said delay line.

7. In a pulse communication system comprising first terminal means for transmitting a series of pulse trains, each of said pulse trains including a synchronizing signal and a plurality of time interleaved channel signals displaced in time from said synchronizing signal, a second terminal means for receiving said pulse trains through a common medium interconnecting said terminals, an intermediate station coupled to said medium and comprising a normally conductive path and a normally non-conductive path for said pulse trains through said intermediate station, a signal source, means included in said non-conductive path to modulate said pulse trains in accordance with the signals of said signal source, means responsive to said synchronizing signal to produce an "on" gate pulse and an "off" gate pulse corresponding in time to a selected one of said channel signals, means responsive to said "off" gate pulse to render said conductive path non-conductive during the occurrence of said selected channel signal, and means responsive to said "on" gate pulse to render said non-conductive path conductive during the occurrence of said selected channel signal for passage of said selected channel signal, said selected channel signal carrying the modulation of said signal source, said non-conductive path including a variable delay means the time delay of which is varied in accordance with the signal of said signal source to time modulate said pulse trains, said variable delay including a low-pass filter-type delay line and the signal of said signal source modulates the inductance and capacitance of said delay line simultaneously.

8. In a pulse communication system comprising first terminal means for transmitting a series of pulse trains, each of said pulse trains including a synchronizing signal and a plurality of time interleaved channel signals displaced in time from said synchronizing signal, a second terminal means for receiving said pulse trains through a common medium interconnecting said terminals, an intermediate station coupled to said medium and comprising a normally conductive path and a plurality of normally non-conductive paths for said pulse trains through said intermediate station, a plurality of signal sources, means coupling each of said signal sources to a respective one of said non-conductive paths, means included in said non-conductive paths to modulate all of the signals of said pulse trains in accordance with the respective signals of said signal sources, means responsive to said synchronizing signal to produce a plurality of "off" gate pulses and a plurality of "on" gate pulses each "off" gate pulse and each "on" gate pulse corresponding in time to selected ones of said channel signals, means responsive to said "off" gate pulses to render said conductive path non-conductive during the occurrence of each of said selected channel signals, and means in each of said non-conductive paths responsive to respective ones of said "on" gate pulses to render said non-conductive paths conductive during the occurrence of respective ones of said selected channel signals for passage of said selected channel signals, said selected channel signals carrying the modulation of respective ones of said signal sources.

9. In a pulse communication system comprising first terminal means for transmitting a series of pulse trains, each of said pulse trains including a synchronizing signal and a plurality of time interleaved channel signals displaced in time from said synchronizing signal, a second terminal means for receiving said pulse trains through a common medium interconnecting said terminals, an intermediate station coupled to said medium and comprising a normally conductive path and a plurality of normally non-conductive paths for said pulse trains through said intermediate station, a plurality of signal sources, means coupling each of said signal sources to a respective one of said non-conductive paths, means included in said non-conductive paths to modulate said pulse trains in accordance with the respective signals of said signal sources, means responsive to said synchronizing signal to produce a plurality of "off" gate pulses and a plurality of "on" gate pulses each "off" gate pulse and each "on" gate pulse corresponding in time to selected ones of said channel signals, means responsive to said "off" gate pulses to render said conductive path non-conductive during the occurrence of each of said selected channel signals, and means in each of said non-conductive paths responsive to respective ones of said "on" gate pulses to render said non-conductive paths conductive during the occurrence of respective ones of said selected channel signals for passage of said selected channel signals, said selected channel signals carrying the modulation of respective ones of said signal sources, each of said non-conductive paths including a variable delay means the time delay of which is varied in accordance with respective signals of said signal sources to time modulate said pulse trains.

10. A system according to claim 8, wherein each of said non-conductive paths includes a variable delay means the time delay of which is varied in accordance with respective signals of said signal sources to time modulate said pulse trains, said variable delay including a delay multivibrator.

11. In a pulse communication system comprising first terminal means for transmitting a series of pulse trains, each of said pulse trains including a synchronizing signal and a plurality of time interleaved channel signals displaced in time from said synchronizing signal, a second terminal means for receiving said pulse trains through a common medium interconnecting said terminals, an intermediate station coupled to said medium and comprising a normally conductive path and a plurality of normally non-conductive paths for said pulse trains through said intermediate station, a plurality of signal sources, means coupling each of said signal sources to a respective one of said non-conductive paths, means included in said non-conductive paths to modulate said pulse trains in accordance with the respective signals of said signal sources, means responsive to said synchronizing signal to produce a plurality of "off" gate pulses and a plurality of "on" gate pulses each "off" gate pulse and each "on" gate pulse corresponding in time to selected ones of said channel signals, means responsive to said "off" gate pulses to render said conductive path non-conductive during the occurrence of each of said selected channel signals, and means in each of said non-conductive paths responsive to respective ones of said "on" gate pulses to render said non-conductive paths conductive during the occurrence of respective ones of said selected channel signals for passage of said selected channel signals, said selected channel signals carrying the modulation of respective ones of said signal sources, each of said non-conductive paths including a variable delay means the time delay of which is varied in accordance with respective signals of said signal sources to time modulate said pulse trains, said variable delay including a low-pass filter-type delay line and the signal of said signal sources modulates selected components of said delay line.

12. In a pulse communication system comprising first terminal means for transmitting a series of pulse trains, each of said pulse trains including a synchronizing signal and a plurality of time interleaved channel signals displaced in time from said synchronizing signal, a second terminal means for receiving said pulse trains through a common medium interconnecting said terminals, an intermediate station coupled to said medium and comprising a normally conductive path and a normally non-conductive path for said pulse trains through said intermediate station, a signal source, means included in said non-conductive path to modulate all of the signals of said pulse trains in accordance with the signals of said signal source, means responsive to said synchronizing signal to produce an "on" and an "off" gate pulse corresponding in time to a selected one of said channel signals and a demodulating gate pulse corresponding in time to a given one of said channel signals, means responsive to said "off" gate pulse to render said conductive path non-conductive during the occurrence of said selected channel signal, means responsive to said "on" gate pulse to render said non-conductive path conductive during the occurrence of said selected channel signal for passage of said selected channel signal, said selected channel signal carrying the modulation of said signal source, and demodulation means coupled to said conductive path and responsive to said demodulating gate pulse to extract intelligence from said given one of said channel signals.

13. In a pulse communication system comprising first terminal means for transmitting a series of pulse trains, each of said pulse trains including a synchronizing signal and a plurality of time interleaved channel signals displaced in time from said synchronizing signal, a second terminal means for receiving said pulse trains through a common medium interconnecting said terminals, an intermediate station coupled to said medium and comprising a normally conductive path and a normally non-conductive path for said pulse trains through said intermediate station, a signal source, means included in said non-conductive path to modulate said pulse trains in accordance with the signals of said signal source, means responsive to said synchronizing signal to produce an "on" gate pulse and an "off" gate pulse corresponding in time to a selected one of said channel signals, means responsive to said "off" gate pulse to render said conductive path non-conductive during the occurrence of said selected channel signal, and means responsive to said "on" gate pulse to render said non-conductive path conductive during the occurrence of said selected channel signal for passage of said selected channel signal, said selected channel signal carrying the modulation of said signal source, said means to modulate included in said non-conductive path including a variable delay means the time delay of which is varied in accordance with the signal of said signal source to time modulate said pulse trains.

References Cited in the file of this patent

UNITED STATES PATENTS

| | | |
|---|---|---|
| 2,520,534 | Edson | Aug. 29, 1950 |
| 2,547,001 | Grieg | Apr. 3, 1951 |